US005247429A

United States Patent [19]

Iwase et al.

[11] Patent Number: 5,247,429

[45] Date of Patent: Sep. 21, 1993

[54] DISPLAY BOARD

[75] Inventors: Teruhiko Iwase, Toyoake; Takashi Imai, Oobu; Toshio Koura, Nagoya, all of Japan

[73] Assignee: Nippondenso Co., Ltd., Kariya City, Japan

[21] Appl. No.: 795,772

[22] Filed: Nov. 21, 1991

[30] Foreign Application Priority Data

Nov. 21, 1990 [JP] Japan .................................. 2-316623

[51] Int. Cl.[5] .............................................. B01D 11/28

[52] U.S. Cl. .......................................... 362/29; 362/30

[58] Field of Search ........................ 362/26, 27, 29, 30, 362/31, 351

[56] References Cited

U.S. PATENT DOCUMENTS

| | | | |
|---|---|---|---|
| 2,395,718 | 2/1946 | Bradley | 362/29 |
| 3,503,365 | 3/1970 | Baez et al. | 362/29 |
| 4,688,156 | 8/1987 | Suzuki et al. | 362/29 |
| 4,729,067 | 3/1988 | Ohe | 362/31 |
| 4,729,068 | 3/1988 | Ohe | 362/31 |
| 4,860,171 | 8/1989 | Kojima | 362/31 |

FOREIGN PATENT DOCUMENTS 53-2065 4/1978 Japan .

*Primary Examiner*—Richard R. Cole

*Attorney, Agent, or Firm*—Cushman, Darby & Cushman

[57] ABSTRACT

A display board has a light transmitting substrate illuminated by a light source at the back side, a illuminance adjusting layer having a plurality of light reflective dots and formed on the surface at the front side of the substrate, and a colored light transmitting image layer formed on the illuminance adjusting layer. This display board is manufactured by forming a illuminance adjusting layer and image layer sequentially on the same side of the substrate.

6 Claims, 3 Drawing Sheets

DISPLAY BOARD

BACKGROUND OF THE INVENTION

1. Field of the Invention

The present invention relates to a display board illuminated by a light source at the back side. More particularly the present invention defines to a display board which has uniform illumination.

2. Description of the Related Art

Display boards, such as a vehicular meter panel, can be illuminated in the dark by a light source at the back side. These boards have the problem of non-uniformity of illuminance depending upon distance from the light source. On solution to this problem has been to print black dots as am illuminance adjusting layer with their area increasing as they approach the light source on the back side of a light transmitting substrate, as disclosed in Japanese Patent Publication No. 53-2065.

However, in order to obtain the construction set forth above, after forming a colored translucent image layer on the surface of the light transmitting substrate, the substrate must be reversed in order to print and form the above-mentioned black dots, which complicates the manufacturing process.

SUMMARY OF THE INVENTION

It is an object of the present invention to solve the above-mentioned problem and to provide a display board. in which an illuminance adjusting layer is formed easily.

In order to accomplish the above-mentioned object, a display board is formed by forming a illuminance adjusting layer with a plurality of black dots distributed on the surface at the front side of a light transmitting substrate, and a colored translucent image layer is formed at the front side of said illuminance adjusting layer.

In the construction set forth above, when illuminating in the dark, illuminating light emitted from a light source and entering into the light transmitting substrate is appropriately absorbed by the dots of the illuminance adjusting layer to become incident on the image layer illuminating uniformly the display surface irrespective of the distance from the light source.

Furthermore, since both of the illuminance adjusting layer and the image layer are formed on the surface side of the substrate, it is not required to reverse the substrate. Therefore, using a sequential process, it becomes possible to remarkably simplify the manufacturing process.

BRIEF DESCRIPTION OF THE DRAWINGS

FIG. 3 is a sectional detail view taken along line II—II of FIG. 1 used for discussion of illuminating condition in the dark, FIG. 4 is a sectional detail view used for discussion of the day time condition;

FIG. 5 is a sectional detail view taken along line II—II of FIG. 1 used for discussion of illuminating condition in the dark, and FIG. 6 is a sectional detail view used for discussion of the day time condition.

DESCRIPTION OF THE PREFERRED EMBODIMENT

The present invention will be described below as related to embodiments show in the accompanying drawings.

First Embodiment

Figure 1:
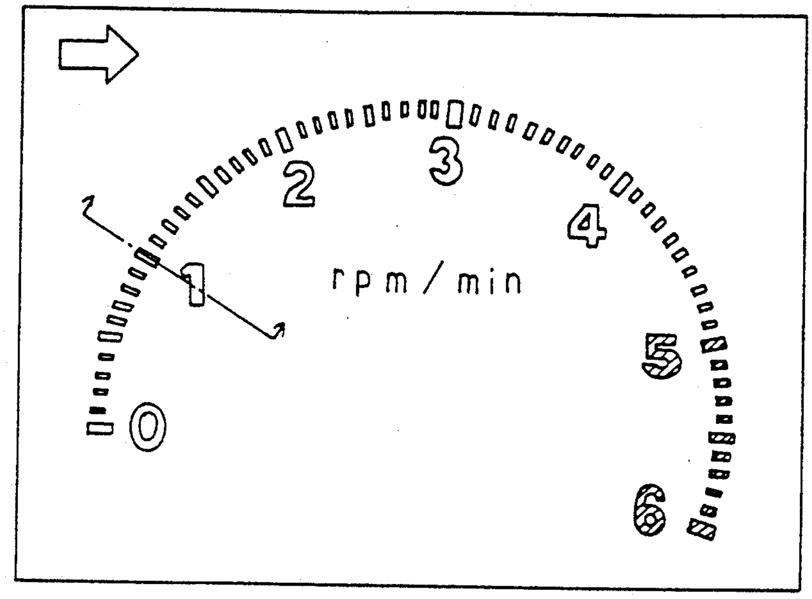
FIG. 1 is a front view of a dial board of a tachometer for a vehicle to which a embodiment of the present invention is applied.

FIG. 1 shows a dial board of a tachometer for a vehicle, to which the present invention is applied.

Figure 2:
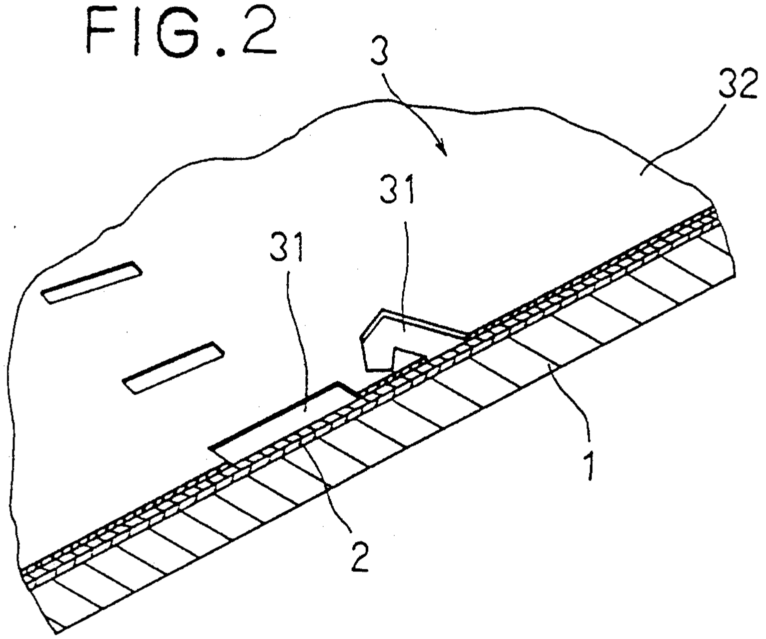
FIG. 2 is a perspective side view in partial cross-section taken along the line II—II of FIG. 1.

FIG. 2 shows a section of the dial board.

A substrate 1 is formed by a transparent polycarbonate resin panel. An illuminance adjusting layer 2 is formed on the surface at the front side of the substrate 1. An image layer 3 consists of white layer 31 and black layer 32. The white layer 31 is overlaid on the illuminance adjusting layer 2 covering the whole surface. The black layer 32 with the gauge figures cut off, is formed over the white layer 31 so that the gauge figures make the dial and the numerals.

Figure 3:
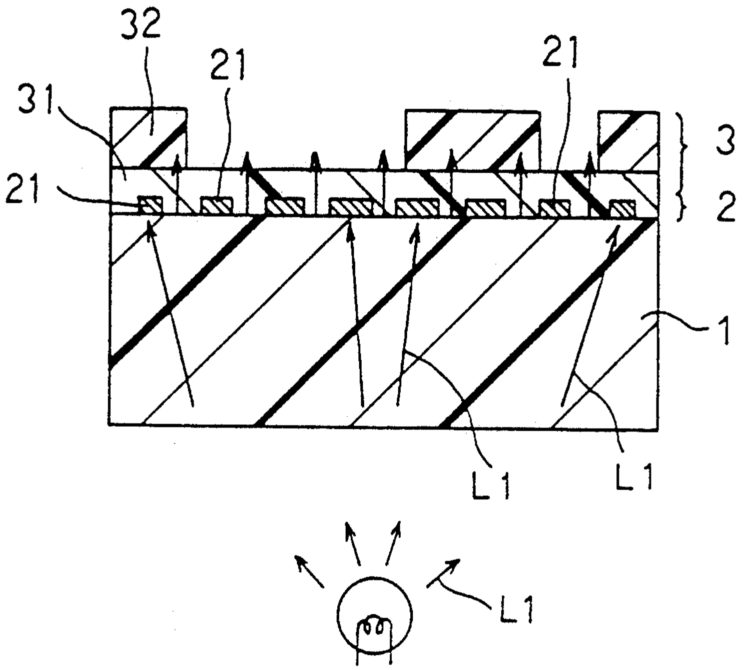
FIGS. 3 and 4 show a first embodiment of the present invention.
Figure 4:
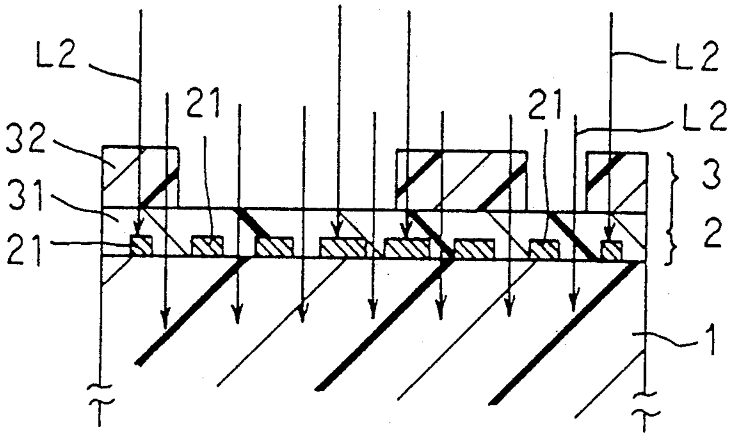

FIG. 3 shows a section of the dial board in detail. A lamp 4 forms a light source and is arranged at the back side (lower side in the drawing) of the substrate 1. The illuminance adjusting layer 2 consists of a plurality of black dots 21. Each dot 21 is printed by offset printing with black ink of density 1.0. According to a predetermined density. The density is expressed as a screen ruling, which represents a number of rows or columns of the dots 21 within one inch. When number of rows is large, the interval between adjacent dots becomes small and thus the area of the dot is reduced. White layer 31 of density 0.7 is overlaid on the dots 21 covering the whole surface. Black layer 32 of density 2.5 is formed by screen printing. White layer 31 and black layer 32 together form a colored light transmitting image layer.

The diameters of dots 21 are varied so that the dot diameter becomes greater as they approach the lamp 4 and thus they operate to further reduce the light transmission amount of the illuminating light L1 (shown by arrow) at the central portion to form a uniform illuminance at the overall surface of the display board. The dots are formed by using a method disclosed in Japanese Patent Publication No. 53-2605.

In the display board construction set forth above, since the dots 21, white layer 31, black layer 32 are all formed on the surface side of the substrate 1, it is not required to reverse the substrate. Therefore, using a sequential process, it becomes possible to remarkably simplify the manufacturing process.

An appended table 1 shows variation of "visibility" and "variability" according to variation of the dot density. Here, the "visibility" represents whether the dots 21 become visible at a distance of 20 cm when turning ON the light. On the other hand, the "variability" represents a difference of the white color at the gauge figure versus pure white when the light is turned OFF. The variability has been measured by a color difference meter (MSPE90 available from Nippon Denshoku Co.). A judgement is made that "variability" is present when the color difference is 2.5 or more.

As it is clear from the appended table 1, when the dot density is 200/inch, "visibility" does not occur, but "variability" occurs.

The reason is that either in the ON state or the OFF state of the illuminating lamp, the illuminating light or external irradiating light are absorbed by each dot 21, and thus no dispersion of light into substrate 1 or image layer 3 is caused and the illuminance at the display board does not increase. "Visibility" and "variability" can be solved by lowering the ink density of the black dots.

Second Embodiment

Figure 5:
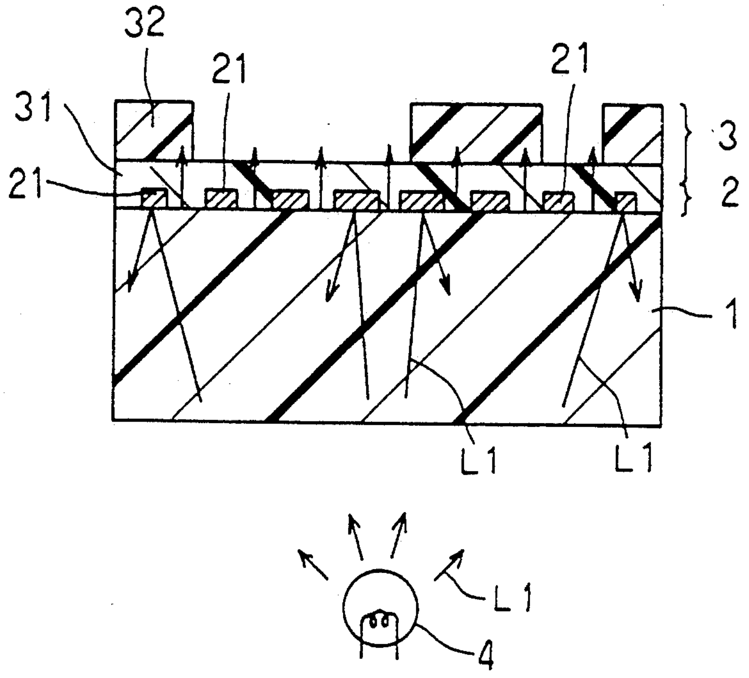
FIGS. 5 and 6 show a second embodiment of the present invention.
Figure 6:
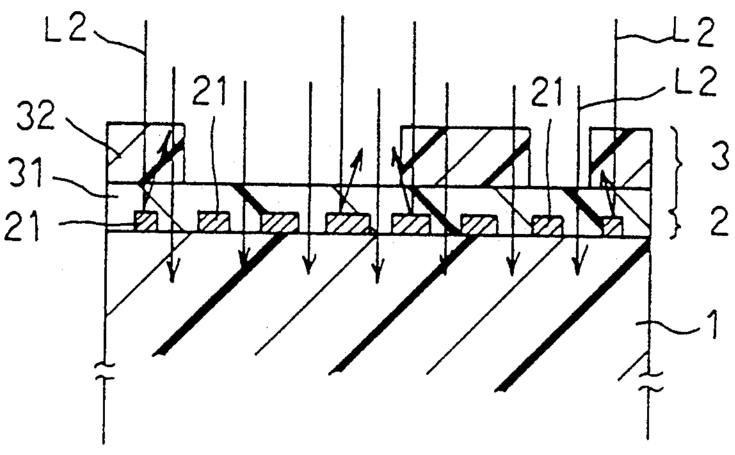

FIG. 5 and FIG. 6 show a second embodiment of the present invention, in which overall construction of the display board is to those of the first embodiment of the present invention. But dots 21 is formed with silver ink of density 1.0 by offset printing.

In the display board construction set forth above, as it is clear from the appended table 1, when the screen ruling of the dots is greater than or equal to 100, "visibility" and "variability" so not occur.

Prevention of "visibility" at illuminating state is obtained by employing the fine dots and by employing a silver color for the dots 21. This allows, as shown in FIG. 5, the illuminating light L1 passing the substrate to become incident on each dot 21 to be reflected and dispersed (not to be absorbed) to increase the back-up luminance to render the dots not invisible.

On the other hand, the reason why the "variability" is not caused, is that, as shown in FIG. 6 the external irradiating light L2 incident through the surface of image layer 3 is reflected and dispersed (not absorbed) by the dots 21 in the image layer 3 improving illuminance. As a result, the variability at the image layer can be resolved.

In this second embodiment, the dots 21 can be formed by silver toner for "CROMALINE" (tradename: available from Du Pont). Also, Japanese Patent Application No. 254209-1989, the dots can be formed by colored photopolymerized resin layer. The material for the resin layer is composed by adding coloring agent and additives, to urethane acrylate which hardens when irradiated with ultra-violet ray.

Thought the above-mentioned embodiment employs the dot silver color, any light reflective color, such as a metallic color, e.g. aluminum, stainless, nickel, chromium and so forth, as well as white or equivalent color or other light reflective colors can be used.

TABLE 1

| Screen Ruling | | 40 | 65 | 100 | 133 | 150 | 200 |
|---|---|---|---|---|---|---|---|
| First Embodiment | Visibility | x | x | X | X | X | ○ |
| | Variability | x | x | x | x | x | x |
| Second Embodiment | Visibility | x | x | ○ | ○ | ○ | ○ |
| | Variability | ○ | ○ | ○ | ○ | ○ | ○ |

What is claimed is:

1. A display board that is illuminated by a light source, comprising:

a light transmitting substrate having a front side, and an opposite back side, and adapted to be illuminated by a light source at the back side;

an illuminance adjusting layer having a plurality of dots which have a color which is light reflective, and attached to a surface at the front side of said substrate; and a colored light transmitting image layer formed over said illuminance adjusting layer, wherein the number of said dots within one inch is more than or equal to 100.

2. A display board according to claim 1, wherein said dots have diameters which vary such that said dot diameter becomes greater as they approach a position of said light source.

3. A display board according to claim 1, wherein said dots are colored photopolymerized resin layer.

4. A display board that is illuminated by a light source, comprising:

a light transmitting substrate having a front side, and an opposite back side, and adapted to be illuminated by a light source at the back side;

an illuminance adjusting layer having a plurality of light reflective colored dots, and attached to a surface at the front side of said substrate;

a white layer formed on said dots, and covering a whole surface at the front side of said substrate; and a black layer selectively formed in a configuration of figures to be displaced, formed over said white layer, wherein the number of said dots within one inch is more than or equal to 100.

5. A display according to claim 4, wherein said dots have diameters which vary such that said dot diameter becomes greater as they approach a position of light source.

6. A method of making a display board that is illuminated by a light source comprising:

a preparing step for preparing a light transmitting substrate;

an illuminance adjusting layer forming step for attaching a plurality of dots of a light reflective color to a surface at a front side of said light transmitting substrate, wherein a number of dots per inch is at least 100; and an image layer forming step for forming a colored light transmitting image layer on the surface at the front side of said light transmitting substrate so that said illuminance adjusting layer is covered with the colored light transmitting image layer.

* * * * *